United States Patent [19]
Di Santo

[11] 3,762,642
[45] Oct. 2, 1973

[54] GRASS GUARD FOR SPRINKLER HEADS

[76] Inventor: Bartel J. Di Santo, 2286 Country Club Dr., Salt Lake City, Utah 84109

[22] Filed: Apr. 17, 1972

[21] Appl. No.: 244,711

[52] U.S. Cl. .............................. 239/201, 239/288.5
[51] Int. Cl. ...................... A01g 25/06, B05b 15/06
[58] Field of Search.................. 239/201, 288.5, 288

[56] References Cited
UNITED STATES PATENTS

| | | | |
|---|---|---|---|
| 2,751,250 | 6/1956 | Block................................. | 239/201 |
| 2,080,341 | 5/1937 | Schumacher ....................... | 239/201 |
| 3,015,448 | 1/1962 | Hurless .............................. | 239/201 |
| 3,650,478 | 3/1972 | Jones.................................. | 239/201 |

Primary Examiner—Lloyd L. King
Attorney—Roger J. Drew

[57] ABSTRACT

A lawn sprinkler has a sprinkler head secured to the upper end of a water-supply pipe which is disposed in the ground. The upper side of the sprinkler head is substantially flush with the upper surface of the ground, and a grass guard is disposed under the sprinkler head with the water supply pipe extending through an aperture in the grass guard. The grass guard comprises a plate-like member which includes two or more complementary sections, the complementary sections being engaged together under the sprinkler head by tongue and groove joints at their edges to form the guard plate-like member having the aperture therethrough, with the water supply pipe extending through the aperture. Disengagement and removal of a complementary section from the other section results in a passageway or clearance channel of width at least slightly larger than the outer diameter of the water supply pipe. Consequently the grass guard can be relatively easily and quickly removed, when broken, and replaced without requiring the prior removal and subsequent reinstallation of the sprinkler head.

5 Claims, 7 Drawing Figures

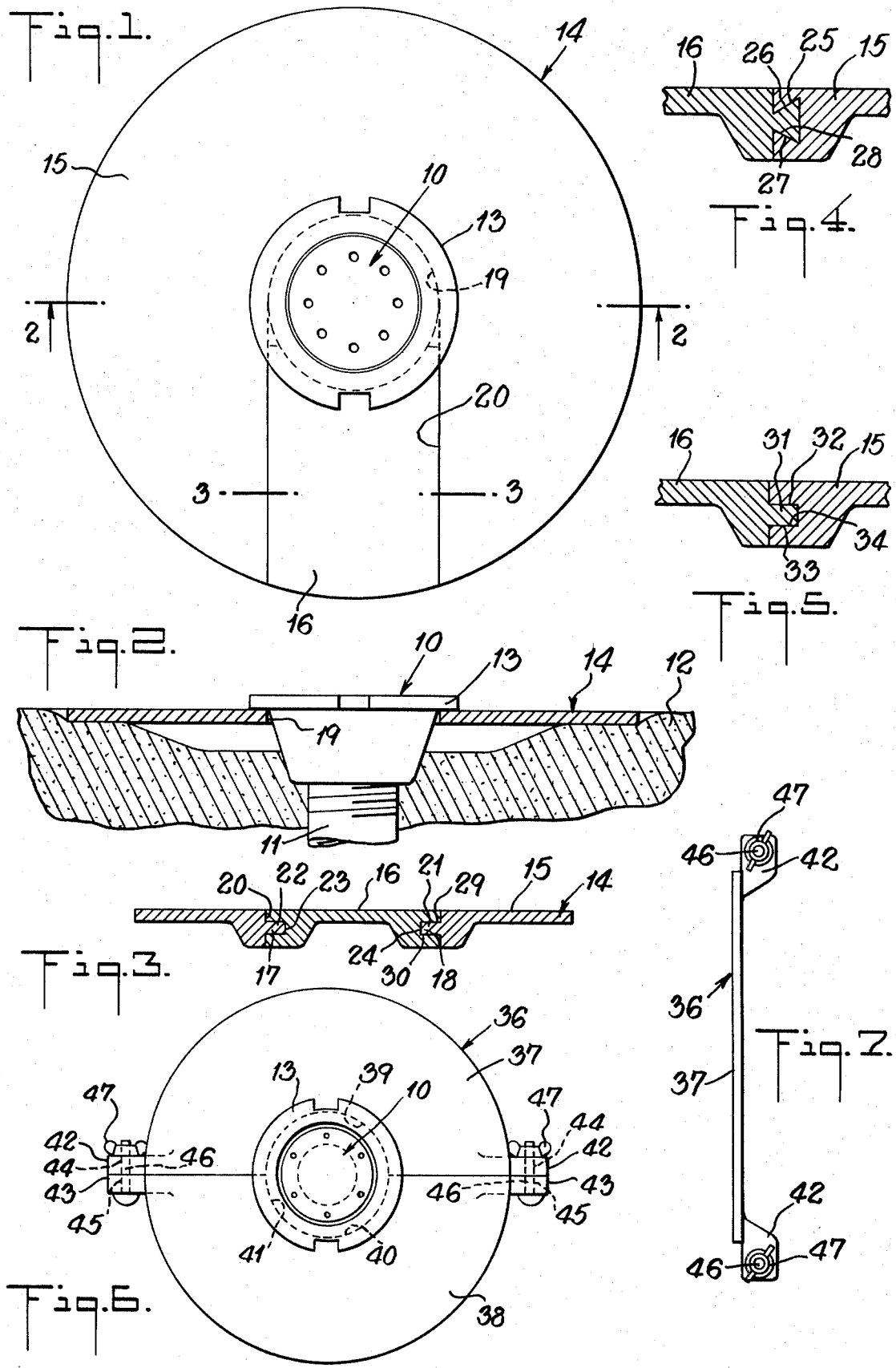

GRASS GUARD FOR SPRINKLER HEADS

BACKGROUND OF THE INVENTION

1. Statement of the Invention

This invention relates to grass guards for sprinklers, and more especially to novel and improved grass guards for sprinkler heads of lawn sprinklers of the type that are installed in lawns so as to be substantially flush with the ground upper surface so as not to interfere with the operation of a lawn mower.

2. Description of the Prior Art

To facilitate efficient discharge of water from lawn sprinkler heads, it is customary to place a plate under the sprinkler head to prevent the growing grass from interfering with the water discharge from the head. This plate is commonly known as a guard or grass guard. The guard has heretofor consisted of a circular or rectangular rigid plate with a center hole large enough for the plate to be fitted under the sprinkler head. To keep the grass from the area between the head and the plate, it is customary to keep the clearance as small as possible. Accordingly the diameter of the hole in the plate is much smaller than the diameter of the sprinkler head but large enough to fit over the sprinkler feed pipe.

To install such a plate it is customary to remove the sprinkler head, insert the plate in position over the sprinkler feed pipe, and reinstall the head on the pipe. This locks the plate under the head and tends to prevent the grass from growing close to the head and thereby interfering with the flow or spray pattern from the head.

The one piece grass guard currently in use is easily placed under the sprinkler head when a new sprinkler system is to be installed. However in cutting the grass and under normal traffic on the lawn, these one piece grass guard plates are sometimes broken and require replacement. To replace such a guard plate necessitates removal of the sprinkler head, placing a new guard plate over the sprinkler pipe, and reinstalling the sprinkler head. This requires pipe tools and considerable physical effort. In addition, frequent removal of the sprinkler head may damage the threads on the head or sprinkler feed pipe. When the feed pipe threads are damaged beyond use, it is necessary to replace the pipe from the main water feed line, and this is a considerable undertaking. If the sprinkler head threads are damaged beyond repair, another head must be acquired and installed at considerable expense.

OBJECTS OF THE INVENTION

A salient object of this invention is to provide grass guards for sprinkler heads of lawn sprinklers which can be rapidly and easily replaced.

Another object of the invention is to provide grass guards for sprinkler heads of lawn sprinkler which can be easily replaced without necessitating the prior removal and subsequent reinstalling of the sprinkler head.

Additional objects and advantages will be readily apparent as the invention is hereinafter described in more detail.

BRIEF SUMMARY OF THE INVENTION

In accordance with the present invention, new and improved grass guards for sprinkler heads of lawn sprinklers are provided which fully achieve all of the objects hereinbefore set forth. The grass guard plate-like member of the grass guard of this invention comprises at least two complementary sections, the complementary sections being engaged together under the sprinkler head by tongue and groove joints at the lateral edges of the complementary sections, to form the grass guard plate-like member having an aperture therethrough of a diameter at least slightly larger than the diameter of the water-supply pipe for the sprinkler head. The water supply pipe, which supplies water under pressure to the sprinkler head, extends through such aperture formed by engagement of the guard complementary sections. Disengagement or withdrawal of a complementary section from the other complementary sections results in a passageway or channel defined by the edges of the remaining sections or sections, such channel being of width at least slightly larger than the diameter of the water supply pipe. Consequently the grass guard can be readily removed and replaced, when necessary or desired, without requiring prior removal and subsequent reinstallation of the sprinkler head.

BRIEF DESCRIPTION OF THE DRAWINGS

FIG. 1 is a top plan view of a lawn sprinkler assembly having a grass guard for the sprinkler head in accordance with one embodiment of the invention.

FIG. 2 is a sectional view taken on line 2—2 of FIG. 1.

FIG. 3 is a sectional view taken on line 3—3 of FIG. 1.

FIG. 4 is a sectional view partially broken away through a tongue and groove joint of complementary sections of the grass guard in accordance with another embodiment of the invention.

FIG. 5 is a sectional view partially broken away through a tongue and groove joint of complementary sections of the grass guard in accordance with still another embodiment of the invention.

FIG. 6 is a top plan view of a lawn sprinkler assembly having a grass guard for the sprinkler head in accordance with a further embodiment of the invention.

FIG. 7 is a side elevation view of the sprinkler assembly of FIG. 6.

DETAILED DESCRIPTION OF THE DRAWINGS

With reference to FIGS. 1 and 2, sprinkler head 10 is secured on the upper end of upstanding water-supply pipe 11 shown in FIG. 2. Sprinkler head 10 is a conventional sprinkler head. The upper side or surface of the sprinkler head is substantially flush with the upper surface of the ground 12 so as not to interfere with or injure a lawn mower or be damaged by the mower, and for the additional reasons of not creating an unsightly appearance on the lawn or being a hazard to people walking on the lawn. Any suitable sprinkler head is utilizable herein including sprinkler heads having heads that move vertically upwardly under the pressure of water for operation. Sprinkler head 10 has generally horizontal flange 13 extending therearound, the flange having a substantially circular periphery.

Grass guard 14 in accordance with this invention comprises two complementary sections 15 and 16 engaged together under sprinkler head 10 by tongue and groove joints 17 and 18, shown in FIG. 3, at the lateral side edges of sections 15 and 16. Larger guard section 15 is a partially circular or arcuate plate or plate-like member having a central partially circular recess 19 and a partially circular periphery. Radical channel 20 having opposed parallel edges and of a width about that or corresponding to the width of smaller section 16 communicates recess 19 with the exterior of section 15 when section 16 is disengaged or removed from section 15. Smaller section 16 has substantially parallel lateral side edges. As shown in FIG. 3, the opposed side edges of channel or passageway 20 of section 15 have tongues 21 and 22 having substantially parallel top and bottom walls 29 and 30 respectively provided in such edges, and extending substantially the entire length of the edges. Complementary guard section 16 has grooves 23 and 24 formed in its lateral side edge faces, grooves 23 and 24 having substantially parallel top and bottom walls and corresponding to the shape of and each of slightly larger width than the width of each tongue in the side edges of guard section 15.

Referring to FIG. 4, grass guard section 16 at its lateral side edges has tongues 25 having outwardly diverging top and bottom walls 26 and 27, and complementary guard section 15 has at its lateral side edges grooves 28 having outwardly converging top and bottom walls and each corresponding to the shape of each tongue 25, guard sections 16 and 15 being engaged together by such tongue and groove joints. This embodiment of FIG. 4 is in contrast to the embodiment of FIGS. 1–3 inclusive wherein guard section 16 is grooved at its lateral edge faces, and guard section 15 is tongued at its lateral edge faces as is hereinbefore disclosed.

With reference to FIG. 5, grass guard section 16 has at its lateral side edges tongues 31 having substantially parallel top and bottom walls 32 and 33 respectively. Complementary guard section 15 has at its lateral side edges grooves 34 having substantially parallel top and bottom walls and corresponding to the shape and slightly wider than the width of tongue 31. Guard sections 16 and 15 are engaged together by such tongue and groove joints.

The tongues and grooves of the complementary grass guard sections of FIGS. 1, 4 and 5 of this invention can be formed in the edge faces of the guard sections by molding when the guard sections are formed of the plastic or synthetic polymeric material. Alternatively the tongues and grooves can be formed in the plastic guard section edge faces, as desired, by cutting. When the complementary grass guard sections of FIGS. 1, 4 and 5 herein are of metal, e.g. ferrous metal, the tongues and grooves can be formed in the edge faces of the guard sections, as desired, by milling or by a combination of stamping and spot-welding.

Referring now to FIGS. 6 and 7 showing a further embodiment of the lawn sprinkler assembly of this invention, grass guard 36 comprises two semi-circular, complementary plates or plate-like members 37 and 38 each having a concave depression 39 and 40 in its straight edge, abutting end portion. Concave depressions 39 and 40 are so located in plate-like members 37 and 38 and of such dimensions that when plate-like members 37 and 38 are abutted together as shown in FIG. 6, concave depressions 39 and 40 register and complement each other to form an aperture 41 having a diameter larger than the diameter of the water-supply pipe (not shown) which extends through aperture 41. Sprinkler head 10 is operatively secured on the upper end of the water supply pipe. The upper surface or side of sprinkler head 10 is substantially flush with the upper or top surface of the ground for the reasons hereinbefore disclosed. Sprinkler head 10 has generally horizontal flange 13 previously described herein. Extension members or ears 42 and 43 extend outwardly from the arcuate periphery of each plate-like member at opposite sides thereof and adjacent the straight edge end portion of each plate-like member. Extension members 42 and 43 each have a hole or aperture 44 and 45 therethrough, with such hole being of slightly larger diameter than the diameter of a bolt 46. Extension members 42 and 43 are welded to the plate-like members 37 and 38 respectively when the grass guard is fabricated of a ferrous metal, e.g. steel. When the grass guard is formed of a synthetic polymeric material, the extension members 42 and 43 can be formed integral with the plate-like members 37 and 38 during molding of the guard member. Holes 44 and 45 in the extension members 42 and 43 register with each other when the plate-like members abut together under the sprinkler head 10, as shown in FIG. 6, and bolts 46 are inserted through the registering holes 44 and 45. Wing nuts 47 are then threadedly engaged on the threaded end portions of the bolts 46 thereby detachably securing together the plate-like members 37 and 38.

If desired, a small depression or concavity (not shown) can be formed in either of the extension members 42 and 43, and a bump or convex-surfaced nipple in the other of the extension members, to assure correct alignment of the plate-like members 37 and 38 when abutted together for securing beneath the sprinkler head 10.

The grass guards of FIGS. 1, 4 and 5 are preferred for the reasons such guards can be readily installed and removed from the lawn sprinkler assembly without requiring any tools.

The sections or plate-like members of the grass guards of this invention can be made of any suitable material, for example plastic or a synthetic polymeric material, and metal. An impact— or shock— resistant plastic which is also weather resistant is preferred. Exemplary of such plastics are nylon and high impact strength polyesters and polystyrene. Examples of metal that are utilizable as fabrication material for the grass guard sections or plate-like members are aluminum, and ferrous metal, e.g. steel.

In the installation of the grass guard of the embodiments of FIGS. 1, 4 and 5 around the sprinkler head, the ground 12, shown in FIG. 2, is preferably removed by digging or otherwise from about the sprinkler head for a sufficient distance and a sufficient depth to enable plate-like guard section 15 to be inserted under flange 13, shown in FIG. 1, of the sprinkler head in a manner such that the water-supply pipe 11 is disposed in recess 19 in guard section 15, and to enable section 16 to be inserted in the channel 20 of guard section 15 in engagement with section 15 by the tongue and groove joints. In the installation of the grass guard of the embodiment of FIG. 6, the ground is preferably also removed by digging or otherwise from the sprinkler head for a sufficient distance and a sufficient depth to enable the plate-like members 37 and 38 to be inserted under flange 13 of the sprinkler head in a manner such that the water-supply pipe is disposed in the formed aperture 41. Sufficient earth should also be removed to enable clearance for insertion of the bolts through the registering orifices in the extension members, and threaded engagement of the nuts on the bolts.

The grass guards of this invention preferably comprise two complementary plate-like sections. If desired, however, the grass guards herein may contain three or four or more complementary plate-like sections.

What is claimed is:

1. In a lawn sprinkler comprising an upstanding water supply pipe disposed in the ground, a sprinkler head secured on an upper end of the water-supply pipe, said head being substantially flush with an upper surface of the ground, and a grass guard having an aperture therethrough of a diameter at least slightly larger than the diameter of the water-supply pipe, said grass guard being disposed under the sprinkler head with the water-supply pipe extending through the aperture, the improvement which comprises the grass guard comprising two complementary plate-like sections, the complementary sections being engaged together under the sprinkler head by tongue and groove joints at the edges of the complementary sections to form a grass guard plate-like member having the aperture therethrough, one of the plate-like sections being a smaller section having substantially parallel side edges, and the remaining plate-like section being a larger section, said larger section having a radial channel formed therein of a width corresponding to the width of said smaller section, the water-supply pipe extending through the aperture, disengagement of a complementary section from the other section resulting in a passageway of width at least slightly larger than the outer diameter of the water-supply pipe.

2. The apparatus of claim 1 wherein the plate-like sections are of a synthetic polymeric material.

3. The apparatus of claim 1 wherein the smaller plate-like section has grooves in its side edges extending substantially the entire length of the guard section, and the larger plate-like section has tongues formed in opposed side edges of the channel formed in said larger section and extending substantially the full length of the channel, the grooves each having a width slightly larger than the thickness of each tongue.

4. The apparatus of claim 1 wherein the smaller plate-like section has tongues in its side edges extending substantially the entire length of the guard section, and the larger plate-like section has grooves formed in opposed side edges of the channel formed in said larger section and extending substantially the entire length of the channel, the grooves each having a width slightly larger than the thickness of each tongue.

5. The apparatus of claim 1 wherein the larger plate-like section comprises at least two complementary plate-like sections.

* * * * *